(12) United States Patent
Bonhomme (10) Patent No.: US 9,502,142 B2
(45) Date of Patent: Nov. 22, 2016

(54) CONTAINMENT FOR A WATER COOLED AND MODERATED NUCLEAR REACTOR

(71) Applicant: Nico M. Bonhomme, Champcella (FR)

(72) Inventor: Nico M. Bonhomme, Champcella (FR)

( * ) Notice: Subject to any disclaimer, the term of this patent is extended or adjusted under 35 U.S.C. 154(b) by 457 days.

(21) Appl. No.: 14/333,651

(22) Filed: Jul. 17, 2014

(65) Prior Publication Data

US 2016/0019988 A1 Jan. 21, 2016

(51) Int. Cl.
*G21C 13/02* (2006.01)
*G21C 13/036* (2006.01)
*G21C 13/10* (2006.01)

(52) U.S. Cl.
CPC ............ *G21C 13/02* (2013.01); *G21C 13/036* (2013.01); *G21C 13/10* (2013.01); *Y02E 30/40* (2013.01)

(58) Field of Classification Search
CPC ......... Y02E 30/35; Y02E 30/40; G21C 1/03; G21C 13/02; G21C 13/036; G21C 13/10; G21C 15/18; G21C 13/028
See application file for complete search history.

(56) References Cited

U.S. PATENT DOCUMENTS

| | | | |
|---|---|---|---|
| 3,356,583 A | 12/1967 | Deighton | |
| 3,423,286 A | 1/1969 | Weems et al. | |
| 3,865,688 A | 2/1975 | Kleimola | |
| 3,937,651 A | 2/1976 | Schabert et al. | |
| 3,984,282 A | 10/1976 | Kleimola | |
| 4,050,983 A * | 9/1977 | Kleimola | G21C 9/00 376/283 |
| 4,080,256 A * | 3/1978 | Braun | G21C 13/00 376/282 |
| 4,131,509 A | 12/1978 | Haidlen | |
| 4,170,517 A * | 10/1979 | Meuschke | G21C 13/028 376/205 |
| 4,210,614 A * | 7/1980 | Kleimola | G21C 9/00 137/68.19 |
| 4,587,080 A | 5/1986 | Johnson | |
| 5,323,427 A * | 6/1994 | Hankinson | G21C 13/028 376/203 |
| 5,388,130 A | 2/1995 | Posta | |
| 5,434,894 A * | 7/1995 | Chiang | G21C 13/028 376/203 |
| 6,173,027 B1 * | 1/2001 | Saito | G21C 9/008 376/283 |
| 6,718,001 B2 * | 4/2004 | Hidaka | G21C 15/18 376/283 |
| 6,795,518 B1 | 9/2004 | Conway et al. | |
| 7,813,464 B1 * | 10/2010 | Harkness | G21C 13/028 376/203 |
| 8,126,107 B2 | 2/2012 | Eckardt et al. | |
| 2007/0092053 A1 * | 4/2007 | Sato | G21C 9/004 376/283 |
| 2009/0161812 A1 | 6/2009 | Reyes et al. | |
| 2012/0121056 A1 * | 5/2012 | Sato | G21C 9/004 376/280 |
| 2013/0259184 A1 * | 10/2013 | Sato | G21C 9/00 376/293 |
| 2015/0228363 A1 * | 8/2015 | Dewan | G21C 3/06 376/458 |

FOREIGN PATENT DOCUMENTS

FR 96 08479 B1 11/1998

* cited by examiner

*Primary Examiner* — Michael Zarroli (57) ABSTRACT

A containment for a water cooled and moderated nuclear reactor incorporates two or more separate containment zones. These zones are constructed in such a manner that a leak or break in the reactor coolant system located within one zone will remain confined within this particular zone, so that no adverse ambient conditions of pressure, temperature, and humidity will propagate to any of the other zones. The separation between zones is achieved by having a partition plate extending between the containment envelope and the reactor coolant system where the partition plate is attached to one of the main components of the reactor coolant system. For example, this can be the reactor pressure vessel, as shown in some of the embodiments. The partition is designed to the same pressure and temperature conditions as the containment vessel envelope to ensure a leak tight and permanent separation between adjacent zones.

6 Claims, 5 Drawing Sheets

CONTAINMENT FOR A WATER COOLED AND MODERATED NUCLEAR REACTOR

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING

Not applicable.

BACKGROUND

Prior Art

The following is a table of some pertinent prior art references.

| US Patents | | | |
|---|---|---|---|
| Patent Number | Kind Code | Issue Date | Patentee |
| 8,126,107 | B2 | 2012 Feb. 28 | Eckardt, et al. |
| 6,795,518 | B1 | 2004 Sept. 21 | Conway, Carelli, et al. |
| 6,173,027 | B1 | 2001 Jan. 9 | Saito et al. |
| 5,388,130 | | 1995 Feb. 7 | Posta |
| 4,587,080 | | 1986 May 6 | Johnson |
| 4,131,509 | | 1978 Dec. 26 | Haidlen |
| 4,050,983 | | 1977 Sept. 27 | Kleimola |
| 3,984,282 | | 1976 Oct. 5 | Kleimola |
| 3,937,651 | | 1976 Feb. 10 | Schabert et al. |
| 3,865,688 | | 1975 Feb. 11 | Kleimola |
| 3,423,286 | | 1969 Jan. 21 | Weems et al. |
| 3,356,583 | | 1965 Dec. 5 | Deighton |

| Publication | US. Patent Application Publications | | |
|---|---|---|---|
| Number | Kind Code | Publ. Date | Applicant |
| 20090161812 | A1 | 2009 Jun. 25 | Reyes, J R et al. |

| Foreign Patent Documents | | | | |
|---|---|---|---|---|
| Foreign Doc. Nr. | Country Code | Kind Code | Publ. Date | Patentee |
| 96 08479 | FR | B1 | 1998 Nov. 6 | Bonhomme |

Water cooled and moderated Nuclear Power Plants in operation today are equipped with a containment which serves to contain the release of radioactivity in case of a leak or breach of the reactor coolant system. In normal operation the reactor coolant system will circulate high pressure water and/or steam in order to transfer heat generated in the reactor core to a power generating plant such as a steam turbine and its electric generator.

Several types of containment are known in the state of the art. The two types which are the most in use in currently operating plants are the pressure suppression containment and the full pressure containment. Pressure suppression containments are used for the so-called Boiling Water Reactors (BWR's), while both the full pressure containment and the pressure suppression type of containments are used in the Pressurized Water Reactors (PWR's). Both BWR and PWR are using light water as reactor coolant and moderator. Heavy water coolant and moderator is used in the Heavy Water Reactors, and these have adopted the full pressure type of containment.

In a BWR water under high pressure (in the order of 70 bars) is made to boil in the reactor core and the steam produced is send directly to the steam turbine plant. The pressure vessel housing the reactor core (reactor pressure vessel), together with its associated principal and auxiliary piping connections is located within one compartment of the containment building, commonly called the drywell. In case of a leak or breach of the reactor coolant system the high pressure steam discharged into the drywell, together with any non-condensable gases normally present in the drywell, will be directed via suitable vent ducts towards a second compartment of the containment building, commonly called the wet well since it contains a large amount of water normally maintained at ambient pressure and temperature. The steam discharged from the drywell will be condensed after mixing with the water mass in the wet well. After completion of the blowdown from the reactor coolant system the pressure within wet well and drywell reaches a steady state equilibrium level compatible with the containment building design. Meanwhile, emergency shutdown and cooling systems will have been started to ensure continued cooling of the reactor core.

In a PWR the energy produced in the reactor core is used to heat a flow of high pressure water (commonly called the primary water flow) which is then send to one or several heat exchangers, commonly called the steam generators, where its heat is transferred to a second flow of water (called the secondary water flow), allowing it to boil (at a pressure of around 70 bars) and thus to produce steam to be directed to the steam turbine plant. At the exit of the primary side of the steam generators the primary water flow is redirected back to the reactor core through the use of reactor coolant pumps. A separate component, called the pressurizer, is connected to the reactor coolant system and serves to maintain the pressure within the reactor coolant system above the saturation pressure. This is achieved by producing a steam bubble in the upper part of the pressurizer through the use of electric heaters mounted below the liquid level in the lower part of the pressurizer. The reactor pressure vessel, the pressurizer, the steam generators, the reactor coolant pumps, the piping sections connecting these principal components, and various associated auxiliary piping and equipment are all located in the containment building. In a full pressure containment as adopted in most (but not all, see below) PWR plants the high pressure steam that would be discharged from the reactor coolant system in case of a leak or a breach is allowed to expand so as to fill the entire volume of the containment building. At the end of the blowdown of the reactor coolant system the containment atmosphere will have been raised to a pressure of the order of around 5 bars and to a temperature close to the saturation temperature at this pressure.

The total building volume required to ensure that at the end of the reactor coolant system blowdown the containment design pressure will not be exceeded is generally larger for a full pressure containment than the total volume in a pressure suppression type of containment. Therefore some of the PWR plant construction projects have also adopted the pressure suppression concept, as for example the ice condenser type containments (see U.S. Pat. No. 3,423,286), and also the early PWR plants of Russian design (designated as VVER types, in particular the VVER-414 model) currently still operating in Russia and in Eastern Europe.

Adaptations and improvements of the basic design concepts briefly sketched above have been proposed. For example, U.S. Pat. Nos. 3,937,651, 4,131,509, and 8,126,107 refer to the practice of separating a full pressure type containment into two zones or compartments, one of which houses the reactor coolant system and its main components. This first zone is not accessible for plant operating personnel during power operation of the reactor. A second zone, which contains a spent fuel storage pool and various auxiliary systems and equipment, is accessible during reactor power operation. In case of a breach of the reactor coolant system, however the entire containment volume is available for expansion of the steam discharge via suitable blowout panels mounted in the separation envelope between the two zones.

Other examples of containment designs with different compartments are U.S. Pat. Nos. 4,587,080 and 6,173,027. In the full pressure PWR containment of U.S. Pat. No. 4,587,080 separate compartments are arranged in the lower part of the containment in order to improve the control of spilled water collecting below the coolant loops from the reactor coolant system break flow and from the condensation of steam exiting with this flow. Here also, the entire containment volume remains available for expansion of the steam discharge since the compartments present vent openings to the upper regions of the containment. In the BWR pressure suppression containment of U.S. Pat. No. 6,173,027 the drywell space is separated into two regions, an upper and a lower region, and in case of a leak or break in one of these two sectors, the other drywell space is made available as an expansion volume for the wet well, thereby increasing the total wet well expansion volume and allowing corresponding savings in the total building volume.

In the design option described in a further example, U.S. Pat. No. 5,388,130 intended for a PWR plant containment concept, the steam generators are installed in separate compartments (also termed "structures" in U.S. Pat. No. 5,388,130) and only the reactor pressure vessel is located in a "primary" containment. Redundant fast acting and automatic isolation valves are installed in the piping connections between the reactor pressure vessel and the steam generators. Due to the automatic isolation feature the steam generator compartments do not need a full pressure retention capability associated with a complete reactor coolant system blowdown transient. Blowout panels or steam release valves are provided for these compartments to avoid exceeding their design pressure limits. The total volume required for the full pressure primary containment housing the reactor core and the reactor pressure vessel can be reduced due to the automatic isolation of the steam generators. This reduction in required building volume comes at the cost of a complication due to the need for reliable automatic isolation valves (4 isolation valves for each steam generator) and the increased complexity in the design of the large diameter primary coolant piping layout and of the containment piping penetrations.

The containment design options of today's water cooled and moderated operating plants and of all variants briefly reviewed above will lead to severe ambient conditions of pressure, temperature, and humidity inside containment resulting from the steam discharge from a breach or leak in the reactor coolant system or, in the case of a PWR, from either the reactor coolant system or the secondary coolant steam or feedwater piping. These are typically of the order of 5 bars, 150 degrees Celsius, and humidity saturated at 100%. Components of safety systems required for emergency shutdown and for cooling of the reactor core, including also instrumentation for monitoring of post-accident conditions, will need to reliably withstand such operating environment. Their operational capability needs to be proven in appropriate testing and quality assurance programs.

The prior art also contains proposals for new versions of containment which have so far not been adopted in operating plants. One of particular interest is the small volume, high pressure containment concept. In this type of design the reactor coolant system blowdown results in a faster and more pronounced increase in the containment pressure and this increased backpressure leads to an earlier end of the blowdown phase at a higher equilibrium pressure and with a sufficient coolant water inventory remaining in the reactor pressure vessel to ensure that the core remains covered and that core cooling remains effective. As a result the requirements for safety systems to be provided for emergency core cooling can be reduced. U.S. Pat. Nos. 3,984,282 and 4,050,983 describe reactor plant designs for respectively a PWR and a BWR according to such a concept for reactor designs of a power level and a plant configuration as commonly practiced in current operating plant (e.g. 3800 MW core thermal power, a typical recirculating BWR core design, and a typical four-loop PWR). A small volume containment in such a plant concept will necessarily lead to a reduced allowance for space and access provisions and will therefore imply greater difficulties in equipment maintenance and in-service inspection (see the comment noted in U.S. Pat. No. 3,984,282, page 19, left column, lines 29 to 36).

The small volume, high pressure containment is also proposed for so-called integral or integrated PWR concepts in U.S. Pat. No. 6,795,518 and US patent application publication no. 20090161812 and for other so called Small Modular Reactors (SMR's) of the PWR type. In these integral PWR concepts all main components of the Reactor Coolant System, such as reactor core, steam generators, reactor coolant pumps, are housed in a single reactor pressure vessel.

US patent application publication no 20090161812 presents an evacuated containment concept in which under normal plant operation a dry air atmosphere under either normal atmospheric pressure or under partial vacuum is maintained in the containment region, thereby permitting improvement in decay heat removal in emergency conditions. The description of example embodiments of this concept includes one example where the containment comprises multiple regions, some of which are normally at atmospheric pressure while others are at partial vacuum. However, in an emergency condition a communication between regions is foreseen to allow pressure release and coolant flow between these regions so that in the emergency condition the entire containment constitutes one single volume.

The configuration proposed in French patent no 96 08479 (International Publication no WO 9801863) presents another means to achieve a much simplified and compact reactor plant layout. This is made possible by adopting a reactor coolant system configuration which makes use of concentric double piping assemblies connecting the reactor pressure vessel and the steam generators, and which, in addition, uses the pressurization concept from U.S. Pat. No. 3,356,583. Pressure in the reactor coolant system is thereby maintained by a core outlet temperature at the saturation condition and by a steam dome in the reactor pressure vessel head, thus eliminating the need for a separate pressurizer vessel as used in standard PWR plant for the control of reactor coolant pressure. This compact reactor coolant system configuration can then also be equipped with a small volume, high pressure containment. In FR-96 08479, however, structural constraints inherent in the proposed containment necessitate a bellows type junction in parts of the containment vessel shell in order to accommodate differential thermal expansion. This flexible joint in the containment boundary will present less secure leak tightness reliability.

The blowdown transient in a high pressure containment will, in the same manner as noted before for the lower pressure containments of current operating plants, lead to severe ambient conditions of pressure, temperature, and humidity. But in addition the higher containment pressure will cause a more severe ambient environment than the 5 bar and 150 degrees Celsius encountered in the lower pressure containments. For a 20 bar maximum containment pressure as seen in some of these small volume, high pressure containments the corresponding saturation temperature would be 212 degrees Celsius. As noted above in the review of prior art proposals the amount and the complexity of components and equipment required for emergency core cooling and for surveillance of essential plant parameters might be much reduced in a high pressure containment. Nevertheless some vital functions as for example essential instrumentation functions, valve operators for vital services, and others, will still be needed. The more severe ambient conditions will at the minimum require careful qualification testing of the equipment and may have a negative impact on its reliability, operating lifetime, and cost.

SUMMARY OF THE INVENTION

In this invention a novel containment for a water cooled and moderated nuclear reactor is disclosed which incorporates two or more separate containment zones. These zones are constructed in such a manner that a leak or break in the reactor coolant system located within one zone will remain confined within this particular zone, so that no adverse ambient conditions of pressure, temperature, and humidity will propagate to any of the other zones. The separation between zones is achieved by having a partition plate extending from a circumference of the inside surface of the containment envelope towards the outside surface of the reactor coolant system where the partition plate is attached to one of the main components of the reactor coolant system. For example, and as presented in some of the embodiments, this can be the reactor pressure vessel. The partition plate is designed to the same pressure and temperature conditions as the containment vessel envelope so as to ensure a substantially leak tight and permanent separation between adjacent zones.

Advantages

Various aspects of the containment configuration with one or more separated zones present advantages such as the flexibility in locating vital equipment and components for emergency core cooling functions inside the containment: these can be disposed in a manner that permits having at least certain parts of vital equipment in a containment zone that will not be exposed to severe high pressure and temperature ambient conditions. The most favored location can be selected depending on the accident scenario to be postulated and on the containment zone in which a leak or break could occur. Other advantages of the various aspects are related to the gain in space and access provisions since with the discharge of a leak or break confined to only one zone in the total containment volume it becomes possible to allow a greater space around main reactor coolant system components within this zone while still ensuring a high backpressure after the reactor coolant system blowdown. The advantages of the high pressure containment exposed above in the review of prior art are therefore attained without jeopardizing important maintenance and in-service inspection activities.

DRAWINGS

List of Reference Numerals

10 reactor core
11 riser channel
12 control rods and instrumentation units
15 reactor pressure vessel
16 inner piping
17 outer piping
18 steam volume and pressurizer
20 reactor coolant pumps
25 component pressure vessel
30 steam generator
32 tube bundle
34 feedwater piping
35 steam line
36 flow baffle
37 channel
40 containment
42 cylindrical vessel
43 cylindrical vessel
44 horizontal cylindrical sections
45 containment dome
50 partition plate
51 lower containment zone
52 upper containment zone
53 upper containment zone
55 partition plate
56 partition plate
60 tie rod hanger

DETAILED DESCRIPTION OF THE INVENTION

The section providing the "Summary of the Invention" has introduced the concept of a containment structure comprising separate containment zones and partition plates which serve to ensure the separation between such zones. The details of such a containment vessel structure and of the partition plate or plates between zones depend on the type of reactor coolant system adopted. For example, in a reactor coolant system concept consisting of a single reactor pressure vessel and the attached main and auxiliary piping connections, such as for a BWR or for an integral type PWR the provision of a partition plate extending to the containment vessel envelop will present less difficulty. On the other hand, for a reactor coolant system configuration comprising several interconnected main components such as in a standard type PWR featuring a reactor pressure vessel, a pressurizer, and several coolant loops with steam generators and reactor coolant pumps the provision of separate containment zones and suitable partition plates will be more complicated.

Figure 1:
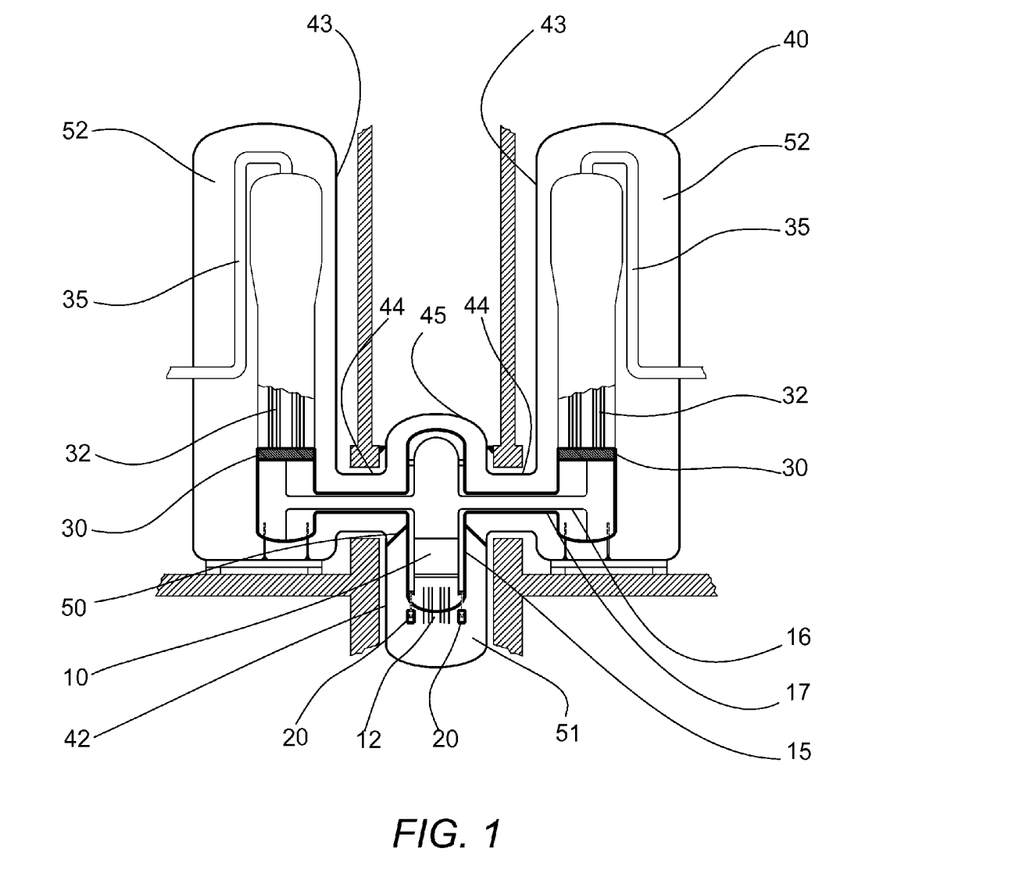
FIG. 1 is an elevation view of a first embodiment.
Figure 2:
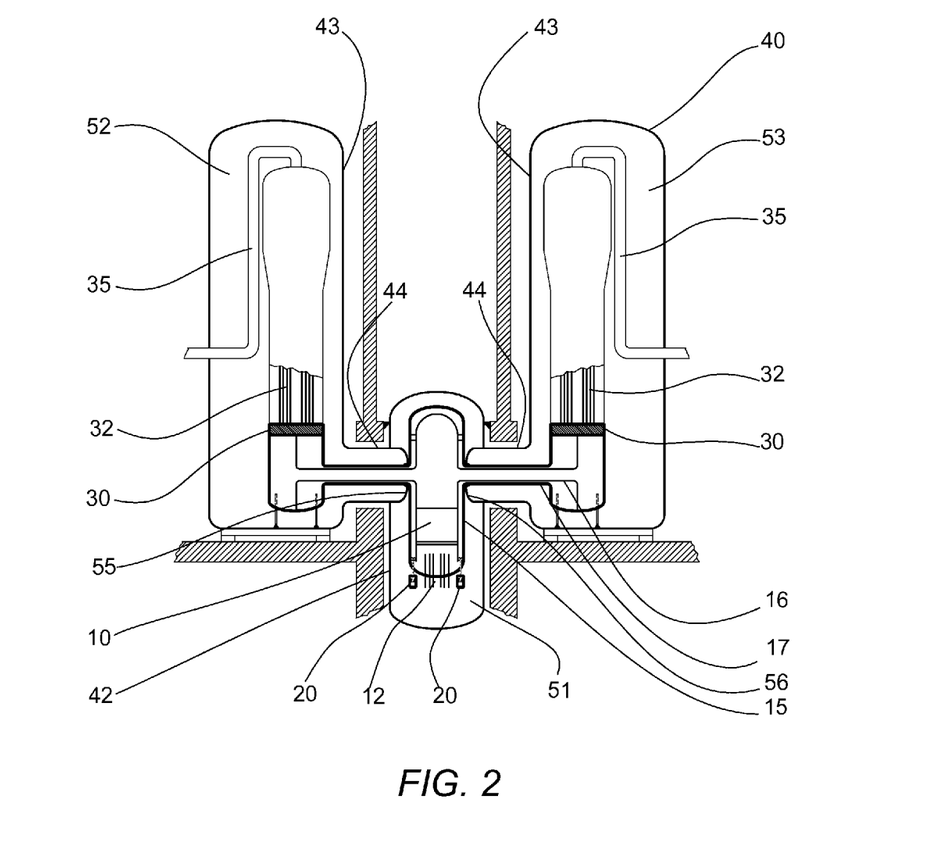
FIG. 2 is an elevation view of a second embodiment.
Figure 3:
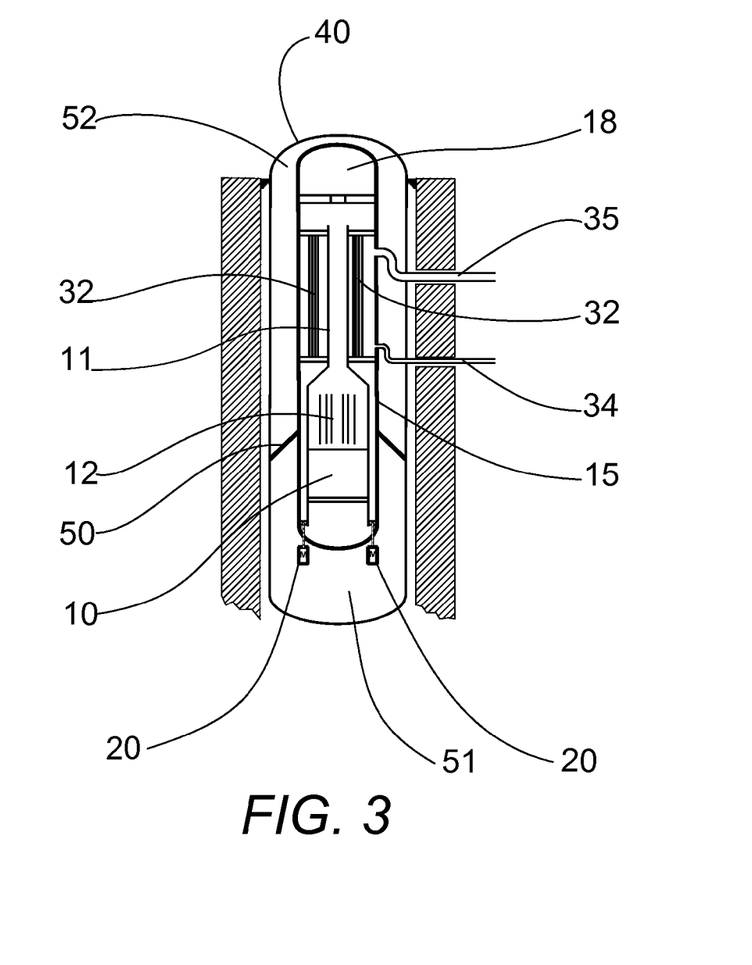
FIG. 3 is an elevation view of a third embodiment.
Figure 4:
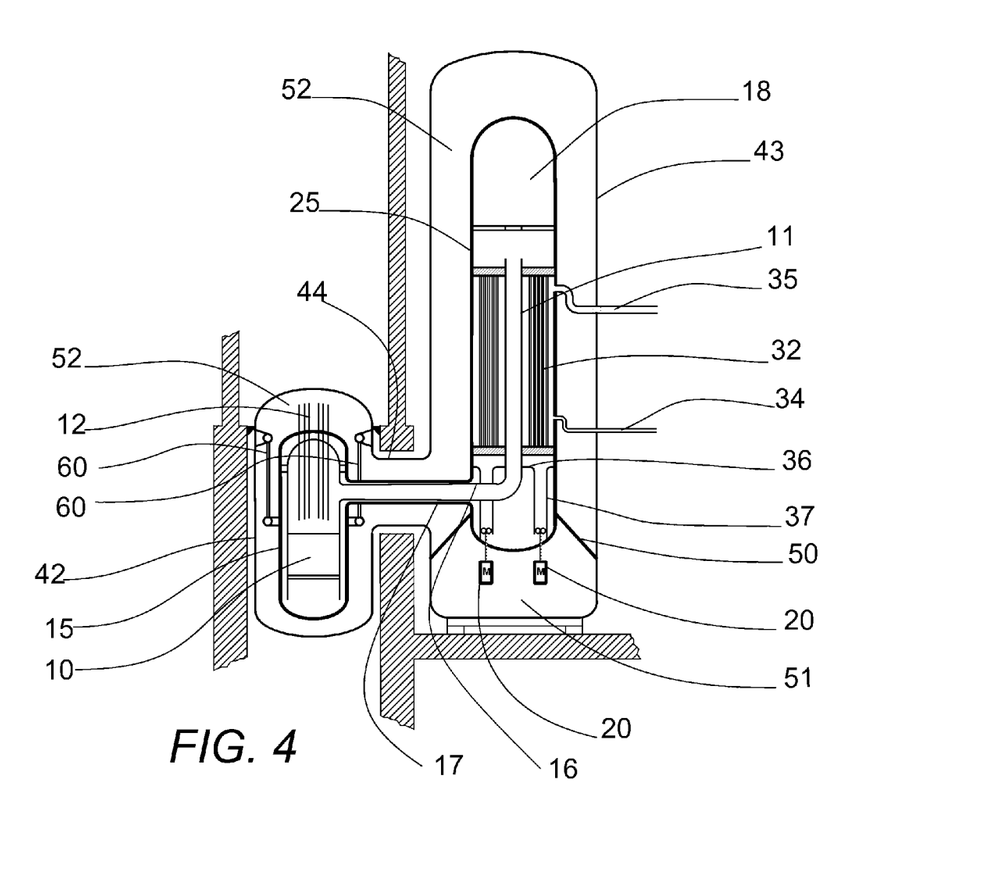
FIG. 4 is an elevation view of a fourth embodiment.
Figure 5:
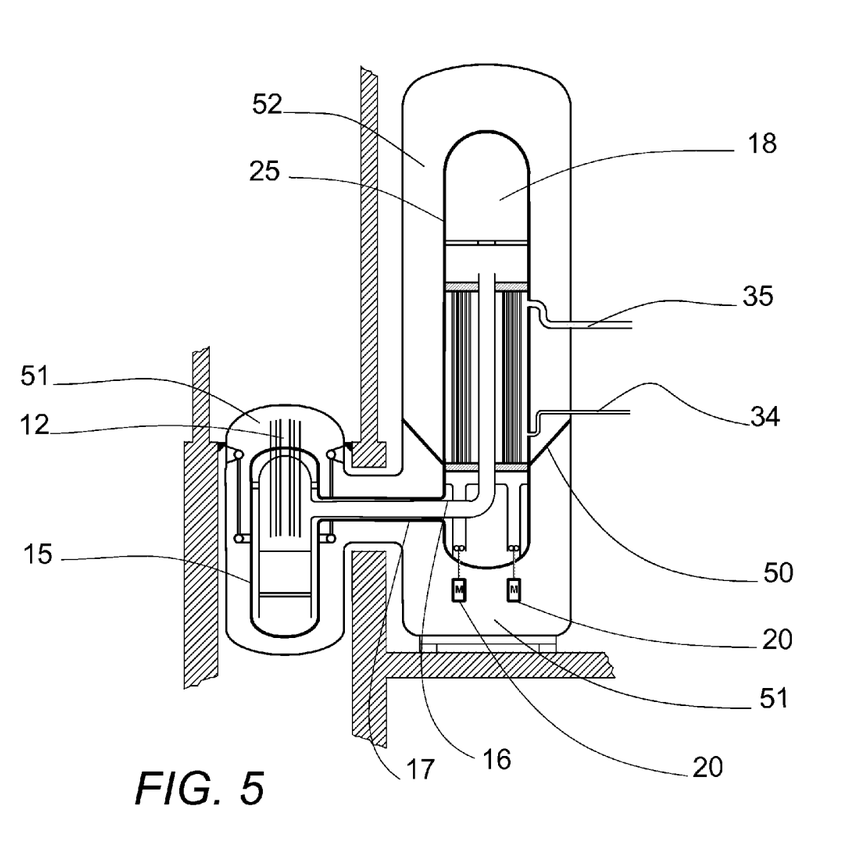
FIG. 5 is an elevation view of a fifth embodiment.

Five examples of embodiments are illustrated in FIG. 1 to 5. The first two, FIG. 1 and FIG. 2, show a reactor coolant system concept which is of the same type as in French patent no 96 08479, but this reactor coolant system is installed in the novel containment featuring separate zones as disclosed herein. The two figures present two different embodiments of the novel containment for this type of reactor coolant system. The third embodiment, FIG. 3, presents an embodiment of the novel containment for a reactor coolant system of a typical integral PWR type. The fourth and fifth embodiment, shown in FIG. 4 and in FIG. 5, present two other examples of the novel containment, this time for a reactor coolant system configuration of a different type, as explained in more detail below.

Detailed Description

FIG. 1—First Embodiment

A first example of an embodiment of the novel containment is illustrated in FIG. 1. The reactor core 10 is housed in the lower region of the reactor pressure vessel 15. Reactor coolant pumps 20 are mounted vertically at the bottom of the reactor pressure vessel 15, in an outer circumferential region of the lower reactor pressure vessel head. The lower reactor pressure vessel head also contains in its central region the penetrations for necessary in-core neutron flux instrumentation and for control rod drive mechanisms that would be required for reactor power surveillance and control. Instrumentation and control rods are schematically indicated in FIG. 1 by reference numeral 12. The reactor coolant pumps 20 will circulate coolant water through the reactor core 10, then through an inner piping 16 of a double concentric primary piping assembly comprising inner piping 16 and outer piping 17, towards steam generators 30. The primary coolant pressure and temperature at the core exit are at saturated conditions and a steam bubble is formed in the upper reactor pressure vessel dome, in a manner as known from U.S. Pat. No. 3,356,583 and as also used in French patent no 96 08479. This pressurization method has been designated as the "self-pressurization" concept. Two steam generators 30 are shown in FIG. 1, but a different number can be envisaged. A vertical U-tube bundle 32 of heat exchanger tubes is mounted in the steam generators 30. After traversing the tube bundle 32 the coolant flow is redirected toward the reactor pressure vessel 15 via the outer circumferential flow path between inner piping 16 and outer piping 17 and is then returned to the suction side of reactor coolants pumps 20. The secondary water flow enters the steam generators through feedwater lines (not shown in FIG. 1), is raised to steam by heat exchange in the steam generators, and then exits via the steamlines 35 to be directed to the steam turbine plant.

The containment 40 is composed of a centrally located vertical cylindrical vessel 42 housing the reactor pressure vessel 15, of additional vertical cylindrical vessels 43, one for each steam generator (two in FIG. 1), and of connecting horizontal cylindrical sections 44 surrounding the concentric primary piping sections 16 & 17. A removable containment dome 45 is located at the top of the cylindrical vessel 42 which contains the reactor pressure vessel 15.

The containment volume is divided into two zones by a partition plate 50 which serves at the same time as a conical support skirt for the reactor pressure vessel 15, maintaining the reactor pressure vessel in a fixed position relative to the containment cylindrical vessel 42. The two containment zones thus formed are a lower zone 51 and an upper zone 52. The lower zone houses the lower part of the reactor pressure vessel 15, the reactor coolant pumps 20, and instrumentation and control rods 12. The upper zone houses the upper part of the reactor pressure vessel 15, the concentric primary piping assemblies 16 & 17, the steam generators 30, and the steamlines 35. Due to the compact reactor coolant system configuration and to the partitioning of the containment into two zones the total volume of the upper containment zone can be made sufficiently small to permit utilization of a small volume, high pressure containment concept as mentioned above in the discussion of prior art background and as further explained in the next section concerning operation. At the same time space allowances around main components and in particular around the steam generators are close to current practice in steam generator compartment rooms of operating plants and are compatible with maintenance and in-service inspection methods as currently in use.

Access openings that are required for maintenance and in-service inspection will have to be provided in the containment vessel envelope. With one exception they are not shown in FIG. 1. Details of their construction are known in the state of the art. One such opening will be needed for the lower containment zone 51, two further openings will be needed in the neighborhood of the two steam generators (or more if there would be more than the two steam generators shown), and finally a last opening, which is illustrated in FIG. 1, will be a removable containment dome 45 above the reactor pressure vessel 15.

Details of various other components and equipment that would be needed for a completely functional reactor plant are not shown in FIG. 1 since they are not essential for an understanding of the novel containment. These are for example radiation shielding around the reactor pressure vessel, various auxiliary piping systems and their accessories such as needed for chemical and volume control of the reactor coolant system, and for emergency core cooling, heating and ventilation services, and others.

Operation—FIG. 1

With the novel containment incorporating two or more separate zones the operational response of the containment will depend on the location of the leak or break that is postulated to occur. As noted above the particular embodiment of FIG. 1 features two separate containment zones, the lower containment zone 51 and the upper containment zone 52.

Leaks or breaks that could occur in the lower containment zone 51 are necessarily of limited size, typically less than around 25 mm equivalent diameter, due to the limited passageway of leakage paths in components and penetrations in the lower pressure vessel head. Upon detection of a leak automatic emergency actions can be initiated. Such actions will include an immediate reactor core shutdown and a rapid cooldown and accelerated depressurization of the reactor cooling system through the steam generators 30. The blowdown from the reactor cooling system will cease when backpressure in the lower containment zone 51 has reached the same value as the reactor cooling system pressure. It is then possible to continue the cooldown of the reactor so as to achieve a safe cold shutdown condition. Loss of inventory from the reactor cooling system will be limited by the volume of the lower containment zone 51. Equipment located in the upper containment zone 52 will not be affected by the blowdown conditions and can be relied upon if necessary for emergency operations.

The leaks or breaks that could occur in the upper containment zone 52 will be located either on the reactor coolant system boundary or on the secondary side, for example on the steam or feedwater piping. The discharge flow will be larger than in the case of leaks in the lower containment zone 51 since the equivalent diameter of the break could have to be assumed as large as the large diameter primary or secondary coolant piping.

For breaks located in the reactor coolant system the discharge flow will be stopped after the containment backpressure has increased to reach the same pressure as the reactor coolant system pressure which is decreasing during the blowdown phase. In the small volume, high pressure containment concept this pressure is chosen at a level sufficient to ensure that the reactor core will not be uncovered at this time. This could be typically around 20 bars, to be confirmed in the design phase of a plant project. After the end of the blowdown phase a less rapid loss of inventory from the reactor coolant system may still occur by spilling of liquid phase water by gravity flow into the lower regions of the upper containment zone. In order to completely stop the loss of inventory it will be necessary to provide a makeup flow of water towards the reactor coolant system or directly into the upper containment zone, for example by provision of injection pumps, by core flooding tanks or by containment flooding tanks. The total volume of the makeup must be sufficient to ensure that the liquid level in the upper containment zone will reach above the location of the break or leak in the reactor coolant system.

The operational sequence described above is known in the state of the art for a small volume, high pressure containment concept. In addition to these known operations the novel containment as shown in embodiment of FIG. 1 provides two improvements that facilitate the emergency core cooling response. The first of these improvements is the availability of equipment in the lower containment zone 51, below the partition plate 50, which is not affected by severe ambient conditions resulting from the steam discharge into upper containment zone 52. In particular, reactor coolant pumps 20 will remain available and can be used to assist in providing coolant flow to the reactor core. It is advantageous to operate the pumps at low speed since after reactor shutdown in a post-accident situation a high flow rate is not required. Also, at lower speed the reactor pumps require less power and can be powered from the emergency electrical sources. The second improvement follows from the position of partition plate 50 which blocks all flow paths to below the reactor pressure vessel and therefore reduces the makeup volume required to flood the upper containment to above the break location.

For breaks located in the secondary side components within the upper containment zone 52, as for example a break in one of the steam lines or of other secondary piping connected to a steam generator the steam discharge will originate from the secondary side and from only one steam generator. This affected steam generator can be automatically isolated by closing of steam and feedwater lines. The reactor shutdown and cooldown to a safe cold shutdown condition can then be ensured using the intact steam generators as a heat sink (one or more, depending on the total number of steam generators provided). The reactor coolant system and in particular the reactor coolant pumps 20 located in the lower containment zone 51 will not be adversely affected by severe ambient conditions resulting from the break.

Detailed Description

FIG. 2—Second Embodiment

The second embodiment of the novel containment, illustrated in FIG. 2, uses the same type of reactor coolant system configuration as the one of the first embodiment. The main components of the reactor coolant system are therefore arranged similarly: the reactor core 10, the reactor pressure vessel 15, reactor coolant pumps 20, instrumentation and control rods 12, steam generators 30, and concentric double piping assemblies comprising inner piping 16 and outer piping 17. Steam lines 35 extend from the steam generators to direct steam flow towards the turbine plant.

In accordance with the invention disclosed herein the containment 40 is partitioned into separate zones. Instead of the two zones as described in the first embodiment, FIG. 1, the second embodiment as shown in FIG. 2 uses a total of three separate zones. One zone, the lower containment zone indicated by reference number 51, contains the reactor pressure vessel. Two upper containment zones, reference numbers 52 and 53, contain the steam generators, one zone for each of the two steam generators.

The containment 40 is composed of vertical cylindrical vessels 42 (for the reactor pressure vessel), 43 (for the steam generators), and horizontal cylindrical sections 44. The partition plates between the containment zones are formed by conical sections 55 and 56 which extend from the prolonged ends of horizontal cylindrical containment sections 44 towards the outer periphery of the main reactor coolant system piping nozzles located on the reactor pressure vessel 15.

The example of the second embodiment as shown in FIG. 2 features two steam generators and three separate containment zones. A different number of steam generators could be used and in such a case the number of containment zones would also be different. For a configuration with three steam generators, for example, there would be a total of four separate containment zones.

The operational sequence following a leak or break within one of the containment zones in the second embodiment closely follows the steps as described for the first embodiment, with a few differences as reviewed below.

The volume of the lower containment zone 51 in the second embodiment is larger than the volume of the corresponding lower containment zone in the first embodiment. Therefore, the increase in containment backpressure following a leak within this zone will be slower and a longer time will be needed before the containment pressure reaches the same level as the reactor coolant system pressure and the leak discharge will be stopped. Inventory loss from the reactor coolant system will also be increased relative to the situation in the corresponding case for the first embodiment.

As regards the leaks or breaks in one of the upper containment zones 52 or 53 in the second embodiment, one can identify two principal changes relative to the case as reviewed for the first embodiment. The first of these is the fact that by monitoring of containment pressure in the separate containment zones the location of the leak or break can be identified in a straightforward manner. This will give definitive information regarding the break or leak location and will provide greater confidence in post-accident management actions. The second change relates to the volume requirements for the separate upper containment zones. To ensure the same containment backpressure at end of blowdown, in the order of 20 bars as noted earlier, the volume of the separate steam generator compartments in the second embodiment (FIG. 2) can be increased relative to the situation in the first embodiment (FIG. 1), since the steam discharge from the break or leak will remain confined to only one steam generator compartment. The larger volume would then allow greater flexibility in arranging maintenance and inspection operations. Alternatively, one could prefer to maintain the smaller volume assignment of the steam generator compartments. Containment design pressure would then have to be increased, and the increased backpressure after a break in the reactor coolant system would ensure a reduction in total inventory loss and a greater margin before risk of uncovery of the reactor core.

Detailed Description

FIG. 3—Third Embodiment

A third embodiment of the novel containment is illustrated in FIG. 3. This example of embodiment uses a reactor coolant system of the integral or integrated PWR type. In such a PWR type all main components of the reactor coolant system, the reactor core, the steam generators, the reactor coolant pumps, the pressurizer, are housed in a single reactor pressure vessel.

Accordingly, in FIG. 3, the reactor core 10 is shown within the reactor pressure vessel 15. Reactor coolant pumps 20, mounted below the lower reactor pressure vessel head, ensure circulation of coolant upward through the reactor core and then through a riser channel 11 to the upper dome of the reactor pressure vessel. Within this upper dome a steam volume and a pressurizer unit 18 can be provided. After exiting from the riser channel 11 the coolant flow is directed downward through vertical heat exchanger tubes of the steam generator tube bundle 32. Steam is generated in the secondary coolant flow transiting on the outside of the heat exchanger tubes, between annular tube plates at the upper and at the lower end of the tube bundle. Secondary coolant flow enters the steam generator through feedwater piping 34 and exits through steam line 35 to be directed to the turbine plant. The primary coolant flow exiting from the lower end of tube bundle 32 continues downward through an annular downcomer region around the reactor core towards the suction side of the reactor coolant pumps. Internal control rod drives are schematically indicated at reference number 12 above the reactor core. Alternatively the control rod drives could also be installed below the lower reactor pressure vessel head through penetrations in the lower head (for example, as shown in the case of FIG. 1 and FIG. 2).

The reactor pressure vessel 15 is installed in the containment 40. The containment 40 is divided into two separate zones, a lower containment zone 51 and an upper containment zone 52. These two zones are separated by a partition plate 50 which serves as a conical vessel support.

With the integral type of PWR as envisaged in the embodiment of FIG. 3 the size of possible leaks or breaks in the reactor coolant system is much reduced since no large diameter piping is needed to connect main components as for example the reactor pressure vessel and the steam generators. Therefore the containment volume required to ensure proper post-accident operation and emergency core cooling functions is reduced as compared with non-integral PWR type reactor coolant system configurations. For the case of the novel containment as illustrated in FIG. 3 this consideration applies to the upper containment zone 52, for which the required volume in case of reactor coolant system breaks will be reduced relative to the situation in the first two embodiments of FIG. 1 and FIG. 2, whereas for the lower containment zone 51 in FIG. 3 this is not the case since leaks or breaks in the lower reactor pressure vessel head will be of a size not much different than in the case of FIG. 1 and FIG. 2 (although with internal control rod drives 12 as in FIG. 3, for example, the number of penetrations in the lower reactor pressure vessel head is greatly reduced and therefore also the likelihood of leaks in the lower containment zone). Also in the third embodiment the lower containment zone will not be affected by adverse ambient conditions resulting from breaks in the upper containment zone and equipment such as the reactor coolant pumps will remain available to assist in emergency cooling functions.

Detailed Description

FIG. 4—Fourth Embodiment

The fourth embodiment as shown in FIG. 4 presents yet another example of the novel containment adapted to a particular reactor coolant system configuration. In this example the reactor coolant system comprises the reactor pressure vessel 15 housing the reactor core 10 and a steam generator or component pressure vessel 25 which houses the steam generators and other components of the reactor coolant system. The two pressure vessels 15 and 25 are connected by a double concentric piping assembly consisting of inner piping 16 and outer piping 17. The reactor pressure vessel 15 also contains the control rods and instrumentation units 12, mounted above the reactor core in the reactor pressure vessel upper head.

The primary coolant flows upward through the reactor core 10, and exits the reactor pressure vessel 15 through the inner piping 16 towards component pressure vessel 25 where coolant flow is directed upward through riser channel 11. In the upper region of component pressure vessel 25 a steam volume and a pressurizer unit 18 are provided. Coolant flowing up through riser channel 11 is redirected downward just below the pressurizer 18 and then flows downward through the inside of heat exchanger tubes arranged in a tube bundle 32 which forms part of the steam generator contained within component pressure vessel 25. Secondary coolant is made to boil on the outside of the heat exchanger tubes and exits through steam lines 35. Feedwater supply towards the steam generator unit is provided through feedwater piping 34. On the primary side a flow baffle 36 is arranged just below the primary side exit of tube bundle 32. Within the flow baffle 36 a plurality of channels 37 protrude downward towards the suction side of reactor coolant pumps 20 mounted on the lower head of the component pressure vessel 25. Exiting from the discharge side of reactor coolant pumps 20 the primary coolant flow is redirected through the annular space between the inner piping 16 and the outer piping 17 of the concentric double piping assembly connecting the reactor pressure vessel 15 and the component pressure vessel 25. After entering the reactor pressure vessel, the coolant flow is diverted downward through the annular downcomer surrounding reactor core 10 and then arrives in the lower reactor pressure vessel head region to reenter the reactor core 10.

As shown in FIG. 4 the containment consists of two vertical cylindrical vessels 42 and 43 connected by a horizontal cylindrical section 44. Vertical cylindrical vessel 42 surrounds the reactor pressure vessel 15 and the control rod and instrumentation units 12. Vertical cylindrical vessel 43 contains the component pressure vessel 25 and the attached reactor coolant pumps 20. The horizontal cylindrical section 44 provides passage for the double concentric piping assembly comprising the inner piping 16 and the outer piping 17.

The containment 40 is partitioned into two separate zones, one of which contains the lower part of the component pressure vessel 25 and reactor coolant pumps 20, while a second zone contains the remaining volume of the containment 40. The first zone is designated by reference numeral 51 and the second zone by reference numeral 52. The partition plate 50 between the two zones is provided by a conical skirt which at the same time serves as a support structure for component pressure vessel 25. The partition plate 50 thereby constitutes a fixed supporting position for the component pressure vessel 25 relative to the containment cylindrical vessel 43. A consequence of having a fixed position for the component pressure vessel 25 is that the support structure for the reactor pressure vessel must be realized in a manner that allows for thermal expansion of the connecting piping sections 16 and 17 between the hot operating condition and the cold shutdown condition of the power plant. The FIG. 4 therefore illustrates one possible realization of such a support in the form of tie rod hangers 60 which permit movement of the reactor pressure vessel along an axis parallel to piping sections 16 and 17. In addition to the tie rod hangers 60 complementary lateral and axial restraints will be required to restrict movement of the reactor pressure vessel in other directions and to limit its displacement in the axial direction parallel to piping sections 16 and 17. Details of such lateral and axial restraints are not shown in FIG. 4. Other possible supporting concepts achieving the same objective are known in the state of the art and are used, for example, for supports of steam generators in existing operating plants of PWR type.

The performance of the novel containment in the fourth embodiment of FIG. 4 following a leak or break within one of the containment zones 51 or 52 is similar to what has been described in the previous three embodiments. Leaks or breaks in the lower containment zone 51 will be of small size, will therefore give rise to only small discharge flow, and the inventory loss from the reactor coolant system will be limited by the volume of the lower containment zone 51. The larger leaks or breaks that may be encountered in the upper containment zone will lead to a larger discharge flow which will be stopped by the rise in containment backpressure before the total loss of inventory would lead to uncovery of the reactor core. Provision of makeup flow will be necessary to ensure that the liquid level in the upper containment zone will be sufficient to allow long term cooling of the core. For such larger leaks or breaks in the upper containment zone the equipment in the lower containment zone will not be affected by adverse ambient conditions. The reactor coolant pumps will therefore remain available to assist in emergency core cooling.

Detailed Description

FIG. 5—Fifth Embodiment

The fifth embodiment, shown in FIG. 5, uses a reactor coolant system configuration which is identical to the one of the fourth embodiment of FIG. 4. However, the containment concept in the fifth embodiment is different from the case of FIG. 4 in one important aspect, which is the location of the partition plate which divides the containment volume into two different zones. As is shown in FIG. 5 the partition plate 50 is arranged above the double concentric piping section consisting of inner piping 16 and outer piping 17. As a result the lower containment zone 51 will be larger than in the case of the fourth embodiment, containing not only the lower part of the component pressure vessel 25 and the reactor coolant pumps 20, but also the reactor pressure vessel 15 and the control rods and instrumentation units 12. The upper containment zone 52 will be smaller than in the case of the fourth embodiment and contains the upper part of the component pressure vessel 25, the feedwater piping 34 and the steam lines 35.

With the partition plate 50 as positioned in FIG. 5 the great majority of leaks or breaks in the reactor coolant system will lead to a discharge of primary system coolant into the lower containment zone 51, the only exception being the possible leaks or breaks from the top of the component vessel 25, i.e. from auxiliary piping or instrumentation lines connected to the steam volume of the pressurizer 18 (such auxiliary lines are not shown in FIG. 5). Leaks or breaks in the secondary coolant system, such as from the steam lines, the feedwater piping, or other secondary side auxiliary lines (not shown in FIG. 5) will all be discharged to the upper containment zone 52, without exception. It would also be possible to select a reactor coolant system configuration and a steam generator design different from the one adopted for the illustration of FIG. 5 in such a manner that the primary side breaks from the reactor coolant system would all without exception be discharged into the lower containment zone and that the secondary side breaks would all discharge into the upper containment zone 52. This would for example be possible with a reactor coolant system including inverted U-tube steam generators as in FIG. 1 and FIG. 2.

Therefore the possible advantages of a partition plate position as illustrated in FIG. 5 will depend on details of the reactor coolant system configuration such as the size of the leaks or the breaks that will have to be considered in the design, construction details that might be used to limit the size of possible leaks, and details of the design of major components such as the steam generators.

CONCLUSIONS, RAMIFICATIONS, AND SCOPE

From a review of the five examples of embodiments it will become apparent that the novel containment featuring different zones will allow improvement of the arrangement of plant components and of vital equipment important for emergency core cooling in post-accident operation: only one of the different containment zones is affected by adverse ambient conditions. Disposing of different containment zones will facilitate the provision of adequate space and access to allow maintenance and in-service inspection operations. At the same time a high pressure containment concept can be accommodated, with the associated advantages of simplification in emergency core cooling features.

The five embodiments described provide many specific details. Many variations in the realization of a novel containment featuring different zones are possible. It is for example possible to select another type of other reactor coolant system configuration than the ones selected in the five examples of embodiments described. Such another type of reactor coolant system could be the boiling water reactor configuration as known in the state of the art, or it could be the more commonly encountered pressurized water reactor configuration, employing separate piping sections between a reactor pressure vessel and the steam generators instead of the double concentric piping assemblies described in the embodiments. Also, different types of steam generator design could be adopted instead of the particular types illustrated in FIG. 1 to 5. Depending on the choice of the reactor coolant system configuration, it could be considered advantageous not to employ the high pressure, small volume containment concept for every one of the two or more different containment zones. One could for example use a high pressure, small volume type of containment design in one of the different zones and a larger volume, lower pressure type of containment concept in another zone. It can also be envisaged to use a pressure suppression type of containment in one containment zone, and a full pressure type (either a high pressure, small volume type, or the more common larger volume, lower pressure) in another containment zone.

The illustrations of the embodiments in FIG. 1 to 5 show containment vessels constructed in steel. Other types of containment vessels, in which the vessel shells and possibly other parts are constructed in prestressed or reinforced concrete can also be envisaged and are compatible with the use of partition plates to realize the separation in different containment zones. The conical sections as shown in the partition plates illustrated in FIG. 1 to 5 are attached to the inside of the containment envelope on one side and to the outside of the reactor coolant system envelope on the other side. These attachments can be realized in either a welded or a bolted steel construction, or through the use of any other suitable mechanical construction providing a leak tight separation between the containment zones.

Considering the details of the five embodiments described and the short review of various possible modifications discussed above it will be appreciated by those skilled in the art that various modifications and alternatives to those details could be developed in light of the overall teachings of the disclosure. Therefore the particular arrangements described are meant to be illustrative only and they should not be construed as limitations on the scope, but as exemplifications of possible embodiments.

Accordingly, the scope should be determined by the appended claims and their legal equivalents rather than by the embodiments described.

I claim:

1. A containment for a water cooled and moderated nuclear reactor comprising
    (a) a containment envelope providing a closed and substantially leak tight containment volume,
    (b) a reactor coolant system housing said water cooled and moderated nuclear reactor and located inside said containment envelope, and comprising
        (b1) a reactor pressure vessel in which the core of said water cooled and moderated nuclear reactor is located, and
        (b2) reactor coolant pumps or reactor coolant recirculation pumps which are mounted at the lower part of said reactor pressure vessel,
    (c) and one substantially leak tight partition plate, extending from a circumference of the inside surface of said containment envelope towards an outside surface of said reactor pressure vessel, dividing said containment volume into two permanently separated containment zones, an upper containment zone above said partition plate and a lower containment zone, in which said reactor coolant pumps or reactor coolant recirculation pumps are located, and which is located below said partition plate,
whereby, under essentially all normal and under essentially all emergency plant operating conditions, each of the separate containment zones will provide confinement of high pressure and temperature steam and water that might be discharged following a leak or a break within this one containment zone, so that no adverse ambient conditions of pressure, temperature, and humidity will propagate to any of the other containment zones,
and whereby in particular said reactor coolant pumps or reactor coolant recirculation pumps will be protected against adverse ambient conditions resulting from leaks or breaks leading to discharge of high pressure steam or water into said upper containment zone and will remain available for emergency cooling operations following such leaks or breaks.

2. A containment for a water cooled and moderated nuclear reactor comprising
    (a) a containment envelope providing a closed and substantially leak tight containment volume,
    (b) a reactor coolant system housing said water cooled and moderated nuclear reactor and located inside said containment envelope, and comprising
        (b1) a reactor pressure vessel in which the core of said water cooled and moderated nuclear reactor is located, and
        (b2) a plurality of steam generators, each of which being connected to said reactor pressure vessel by a double piping assembly featuring inner piping and outer piping, thereby providing separate flowpaths in two directions between said reactor pressure vessel and each of said steam generators,
    (c) and a plurality of substantially leak tight partition plates, one for each of said double piping assemblies, extending from a circumference of the inside surface of said containment envelope towards an outside surface of said-outer piping at the point where said outer piping connects to a nozzle located in said reactor pressure vessel, dividing said containment volume into a plurality of permanently separated containment zones, the number of which is equal to one more than the number of said steam generators, the additional one corresponding to the volume surrounding said reactor pressure vessel,
whereby, under essentially all normal and under essentially all emergency plant operating conditions, each of the separate containment zones will provide confinement of high pressure and temperature steam and water that might be discharged following a leak or a break within this one containment zone, so that no adverse ambient conditions of pressure, temperature, and humidity will propagate to any of the other containment zones.

3. A containment for a water cooled and moderated nuclear reactor comprising
    (a) a containment envelope providing a closed and substantially leak tight containment volume,
    (b) a reactor coolant system housing said water cooled and moderated nuclear reactor and located inside said containment envelope, and comprising
        (b1) a reactor pressure vessel in which the core of said water cooled and moderated nuclear reactor is located,
        (b2) a component pressure vessel housing at least one or more steam generators and possibly other components,
        (b3) and a double piping assembly featuring inner piping and outer piping, thereby providing separate flowpaths in two directions between said reactor pressure vessel and said component pressure vessel,
    (c) one substantially leak tight partition plate, fastened to said containment envelope and to said component pressure vessel, and serving at the same time as a support structure maintaining said component pressure vessel in a fixed position relative to said containment envelope, and dividing said containment volume into two permanently separated containment zones, a lower containment zone below said partition plate and an upper containment zone above said partition plate, (d) and a support structure for said reactor pressure vessel allowing some limited movement of said reactor pressure vessel in a lateral direction parallel to the axis of symmetry of said double piping assembly as will be necessary to accommodate thermal expansion and contraction while maintaining said reactor pressure vessel in a fixed position along all other directions of movement, whereby, under essentially all normal and under essentially all emergency plant operating conditions, each of said two separate containment zones will provide confinement of high pressure and temperature steam and water that might be discharged following a leak or a break within this one containment zone, so that no adverse ambient conditions of pressure, temperature, and humidity will propagate to the other containment zone.

4. The containment of claim 3 wherein said partition plate is fastened to said containment envelope and to said component pressure vessel at a level below said double piping assembly.

5. The containment of claim 4 wherein said reactor coolant system comprises reactor coolant pumps which are mounted at the lower part of said component pressure vessel, and are located within said lower containment zone, whereby said reactor coolant pumps will be protected against adverse ambient conditions resulting from leaks or breaks leading to discharge of high pressure steam or water into said upper containment zone and will remain available for emergency cooling operations following such leaks or breaks.

6. The containment of claim 3 wherein said partition plate is fastened to said containment envelope and to said component pressure vessel at a level above said double piping assembly.

* * * * *